E. C. SHAW.
VEHICLE WHEEL RIM.
APPLICATION FILED JUNE 14, 1907.

927,687.

Patented July 13, 1909.

WITNESSES:
E. Murray Moses.
Oliver Williams

INVENTOR
Edwin C. Shaw
BY
Edward Davis
ATTORNEY

UNITED STATES PATENT OFFICE.

EDWIN COUPLAND SHAW, OF AKRON, OHIO, ASSIGNOR TO THE B. F. GOODRICH COMPANY, OF AKRON, OHIO, A CORPORATION OF OHIO.

VEHICLE-WHEEL RIM.

No. 927,687.  Specification of Letters Patent.  Patented July 13, 1909.

Application filed June 14, 1907. Serial No. 379,029.

*To all whom it may concern:*

Be it known that I, EDWIN COUPLAND SHAW, a citizen of the United States, and a resident of Akron, in the county of Summit and State of Ohio, have invented certain new and useful Improvements in Vehicle-Wheel Rims, of which the following is a specification.

This invention relates to that class of vehicle wheel rims adapted for holding pneumatic tires, or other tires of resilient material in which one of the tire retaining flanges is made removable.

It has been customary in rims for holding pneumatic tires to make both of the tire retaining flanges fixed, but this arrangement makes the application of the tire difficult, and renders it impossible to use tires of the type provided with inextensible beads. By making one of the retaining flanges removable, it is obvious that a tire can be applied to the rim without stretching so that an inextensible tire can be used just as well as one of any other type. In this case specific means are provided for holding the removable flange in place, these means comprising a locking ring adapted to lie within a groove formed at the edge of the tire seating member and provided with expanding means whereby it will be caused to enter a groove formed in the inner face of the removable tire flange and prevent the flange from slipping off its seat.

Figure 1:
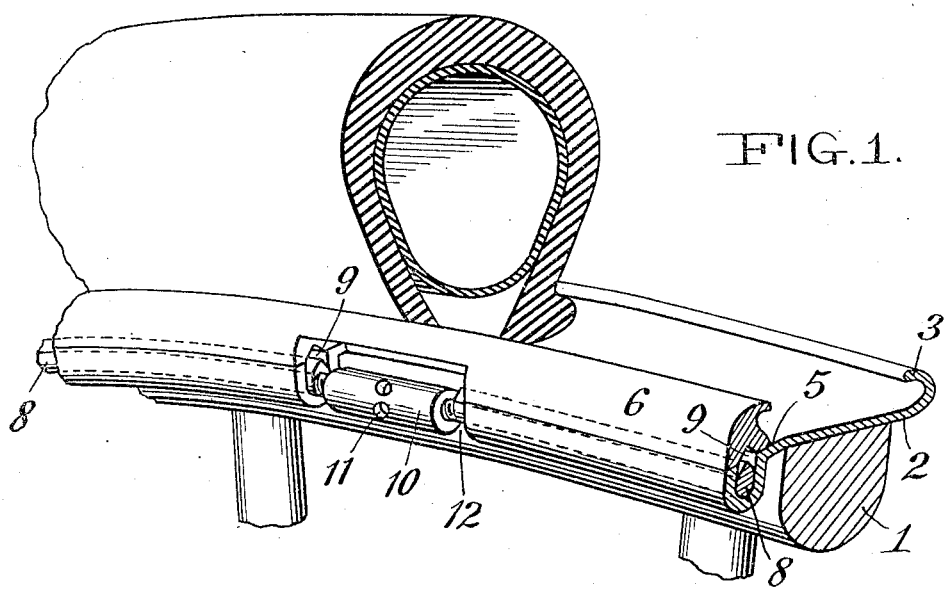
Figure 2:
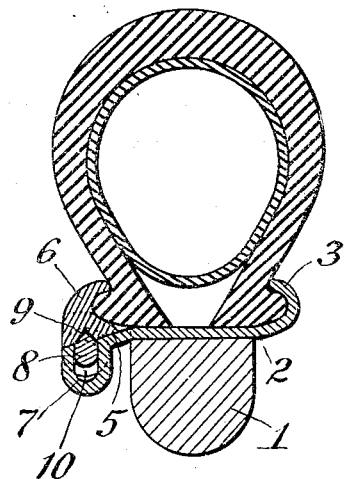
Figure 3:
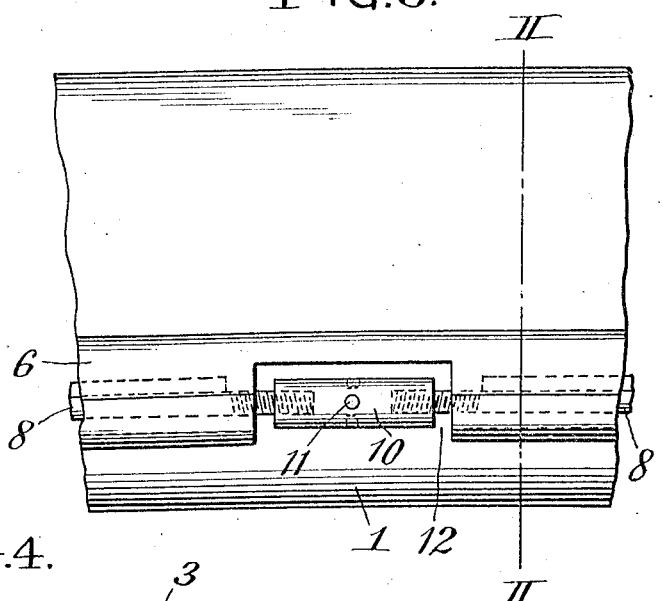
Figure 4:
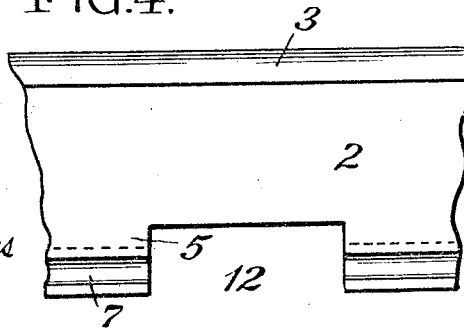

Referring to the drawings which form a part of this specification, Figure 1 is a sectional perspective view of a rim and tire illustrating one form of my invention. Fig. 2 is a section of the rim and tire shown in Fig. 1 taken on line II—II of Fig. 3. Fig. 3 is a side elevation of the rim and tire shown in Figs. 1 and 2. Fig. 4 is a plan view of the tire seating member showing the cut-out portion to receive the ring expanding means.

Referring to the drawings by reference numerals, 1 is the felly upon which is fixed in any suitable manner a tire seating member or fixed rim 2. This rim is shown as provided at one edge with a fixed tire retaining flange 3, though this flange may be made detachable if desired. The other edge of this rim 2 is provided with a seat 5 upon which fits an endless detachable flange 6. In this example of my invention the seat 5 is shown as inclined downwardly and outwardly to facilitate the positioning of the flange 6, and to make a snug taper fit with the flange, but the incline is not necessary and the seat may be given any form so long as it does not project above the level of the tire seating portion. An annular groove 7 is formed in the seat in which lies a locking ring 8. The inner face of the tire retaining flange 6 is provided with a groove 9 to receive the outer portion of the locking ring. This groove and the said outer portion of the locking ring are in the example chosen for purposes of illustration shown as correspondingly V-shaped, but it is obvious that any other configuration may be used.

Means are provided for contracting and expanding the locking ring. These means are herein shown as comprising a turnbuckle 10 into which the ends of the locking ring screw. The turnbuckle is provided with sockets 11 or other suitable means for engagement of a tool for rotating it. The groove 7 must be of such depth that when the ends of the locking ring are drawn together, the ring will lie wholly within the groove, thus permitting the flange 6 to slide freely off its seat. A slot 12 of suitable form and dimensions is cut in the rim to receive the turnbuckle 10 and permit it to be manipulated.

The operation of the device is as follows: To remove the flange the turnbuckle is operated to bring the ends of the locking ring together when the flange and tire can be freely removed. To apply a tire it is slipped into place and fitted to the flange 3 and the removable flange 6 slipped on its seat and engaged with the foot of the tire. The ends of the locking ring are then spread apart by means of the turnbuckle, thus increasing the diameter of the ring and causing it to engage the groove 9 in the inner surface of the retaining flange 6, locking the retaining flange and tire firmly in position. I have shown the flanges formed to engage a clencher tire, but it is obvious that they may be given a suitable configuration to retain any other type of tire.

I do not desire to limit myself to the exact construction shown, which has been chosen merely as an illustration of one form in which my invention may be embodied since modifications may be freely made which I desire to cover so long as the operative combination of elements is retained.

Having thus described my invention I claim:

1. In combination in a vehicle wheel, a tire seating member provided at one edge with a downwardly and outwardly inclined seat, an annular groove in said seat, an endless tire retaining flange adapted to engage said seat, a groove in the inner surface of said flange, a locking ring provided with a V-shaped outer face in the groove of said tire seating member, and means for expanding and contracting said locking ring.

2. In combination in a vehicle wheel, a tire seating member provided with an annular groove, an endless tire retaining flange adapted to seat upon said member over said groove, a locking ring in said groove, a V-shaped groove in the inner surface of said endless flange, said locking ring being provided with a V-shaped outer face adapted to enter said V-shaped groove, and means for expanding and contracting said locking ring.

EDWIN COUPLAND SHAW.

Witnesses:
E. QUINCY MOSES,
OLIVER WILLIAMS.